(12) United States Patent
Deibler (10) Patent No.: US 11,704,607 B2
(45) Date of Patent: *Jul. 18, 2023

(54) POSITION-CENTRIC PERSONNEL ASSESSMENT APPARATUS AND METHOD

(71) Applicant: Kevin Andrew Deibler, Catawissa, PA (US)

(72) Inventor: Kevin Andrew Deibler, Catawissa, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,066

(22) Filed: Jan. 14, 2022

(65) Prior Publication Data

US 2022/0138665 A1 May 5, 2022

Related U.S. Application Data

(63) Continuation of application No. 17/075,060, filed on Oct. 20, 2020, now Pat. No. 11,244,258, which is a
(Continued)

(51) Int. Cl.
*G06Q 10/0631* (2023.01)
*G06Q 10/0639* (2023.01)
(Continued)

(52) U.S. Cl.
CPC . *G06Q 10/063112* (2013.01); *G06F 16/2465* (2019.01); *G06F 16/27* (2019.01); *G06Q 10/0631* (2013.01); *G06Q 10/06398* (2013.01)

(58) Field of Classification Search
CPC ....... G06Q 10/063112; G06Q 10/0631; G06Q 10/06398; G06F 16/27; G06F 16/2465
See application file for complete search history.

(56) References Cited

U.S. PATENT DOCUMENTS 8,078,486 B1 12/2011 Mclean et al.
2007/0143167 A1 6/2007 Cohen
(Continued)

FOREIGN PATENT DOCUMENTS

CN 101454747 A 6/2009
CN 101470711 A 7/2009
CN 102317962 A 1/2012

OTHER PUBLICATIONS

Notification of Transmittal of the International Search Report and the Written Opinion of the International Searching Authority dated Jan. 22, 2016, in connection with corresponding Application No. PCT/US2015/054912 (15 pgs.).
(Continued)

*Primary Examiner* — Deirdre D Hatcher
(74) *Attorney, Agent, or Firm* — Maier & Maier, PLLC (57) ABSTRACT

A computer-implemented position-centric personnel modeling apparatus, system, and method may be provided. A nodal hierarchy may be created to correlate with the personnel structure of a business enterprise, wherein each node may be a cyberspace representation of an individual within the personnel structure of the business enterprise. Attributes correlating to individual personnel in the business enterprise may be mapped to a respective node. Objectives may subsequently be tasked within the model and the nodal hierarchy may be rearranged based on the results. Results from the model may optionally be reflected by a business enterprise.

20 Claims, 4 Drawing Sheets

Related U.S. Application Data continuation of application No. 14/817,875, filed on Aug. 4, 2015, now Pat. No. 10,846,629, which is a continuation of application No. 14/683,637, filed on Apr. 10, 2015, now abandoned.

(60) Provisional application No. 61/979,542, filed on Apr. 15, 2014.

(51) Int. Cl.
*G06F 16/27* (2019.01)
*G06F 16/2458* (2019.01)

(56) References Cited

U.S. PATENT DOCUMENTS

| | | |
|---|---|---|
| 2008/0281651 A1 | 11/2008 | Brennan et al. |
| 2009/0030927 A1 | 1/2009 | Cases et al. |
| 2010/0100510 A1* | 4/2010 | Balaban .................. G06N 7/08 706/14 |
| 2011/0015958 A1 | 1/2011 | April et al. |
| 2012/0123956 A1 | 5/2012 | Chenthamarakshan et al. |

OTHER PUBLICATIONS

Analysis, Analysis Practices, and Implications for Modeling and Simulation; Paul K Davis, Amy Henninger; Prepared for the Office of the Secretary of Defense (Year: 2007).

Modeling, Simulation, and Operations Analysis in Afghanistan and Iraq; The RAND Corporation; 2014 (Year: 2014).

Examination Report dated Feb. 17, 2021 in corresponding Application No. GB1718518.2; 5 pages.

Chinese Office Action dated Mar. 3, 2021, in connection with corresponding CN Application No. 201580080466.X (11 pp., including machine-generated English translation).

\* cited by examiner

POSITION-CENTRIC PERSONNEL ASSESSMENT APPARATUS AND METHOD

CROSS-REFERENCE TO RELATED APPLICATIONS

This application is a continuation of U.S. patent application Ser. No. 17/075,060, filed Oct. 20, 2020, which is continuation of U.S. patent application Ser. No. 14/817,875, filed Aug. 4, 2015, which is a continuation of U.S. patent application Ser. No. 14/683,637, filed Apr. 10, 2015, which claims priority to U.S. Provisional Patent Application Ser. No. 61/979,542, entitled "Position-centric Personnel System", and filed Apr. 15, 2014, the contents of which are hereby incorporated by reference in their entirety.

BACKGROUND

Business enterprises regularly use computer-implemented methods and apparatuses for assessing and improving their business. However, while there are tools for effectively assessing resource management and production of various assets, including personnel, there lacks an ability to map, assess, and optimize the allocation of personnel within a business enterprise.

SUMMARY

According to an exemplary embodiment, a non-transitory computer-readable medium for assessing a personnel hierarchy may be provided. The non-transitory computer-readable medium may include instructions stored thereon, that when executed on a process, perform the following steps. The instructions may map personnel attribute data to logically coded nodes within a logically coded unified hierarchy. The instructions may perform a function corresponding to a rule or rule set corresponding to a business strategy or objective. Next, nodes within the logically coded unified hierarchy may be data mined to measure performance of the function. Performance data of all nodes relevant to a rule or rule set may then be aggregated. The performance of each node may be compared with the previous, current, or projected instantiation of the aggregated performance of any or all remaining relevant nodes, and/or to the node itself. The nodes within the hierarchy may then be modified or reassigned, as needed, based on the performance. This may be repeated until a desired end state is achieved.

According to another exemplary embodiment, a computer-implemented position-centric personnel apparatus may be provided. The apparatus may include a memory device configured to store a data structure comprising information related to an individual's performance within a business enterprise hierarchy. The memory device may further include a personnel database. The personnel database may include logically coded nodes within a logically coded unified hierarchy. Each logically coded node may correspond to an individual and the logically coded unified hierarchy may correspond to a business enterprise personnel hierarchy. The memory device may also include at least one rule or rule set associated with a business objective or strategy. The apparatus may include a processor configured to perform functions derived from the rule or rule set, aggregate results of the performance, compare each node's performance with the aggregate results, and reassign nodes based on success in accomplishing objectives. The apparatus may additionally include an input/output device to allow a user to input data, observe results, and set rules.

According to yet another exemplary embodiment, a personnel assessment method may be provided. The method may include providing a memory device configured to store personnel data. It may further include maintaining and periodically updating, on the memory device, a record of personnel within a business enterprise. The record may include data available from internal and external sources. Personnel attribute data from the record of personnel may be mapped to logically coded nodes within a logically coded unified hierarchy. A function corresponding to a rule or rule set, which may correspond to a business strategy or objective, may be performed with each node. Each node within the logically coded unified hierarchy may be data mined to measure performance of the function. The performance data of all nodes relevant to a rule or rule set may be aggregated. The performance of an individual node may be compared with the aggregated performance data of the remaining relevant nodes. Nodes may be modified or reassigned within the hierarchy, as needed, based on performance. This may be repeated until a desired end state has been achieved.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to at least one exemplary embodiment, a position-centric personnel system may be provided. In an exemplary embodiment, the position-centric personnel system may be used to assess and allocate personnel in a business enterprise to maximize the successful accomplishment of objectives, meet an overarching strategy, and achieve a desired end state for the business enterprise. A desired end state may be a final embodiment of a business enterprise. An end state may be static, but may also change, evolve, or otherwise be dynamic. Personnel may be mapped to a unified nodal hierarchy according to a continuum of functional levels and divisions of responsibility within a business enterprise. Position-centric may not employ rank-centric methods. In other words, position may be superordinate to rank. Therefore, personnel may be manipulated to achieve a desired result based primarily on position, not rank.

An exemplary system may include an electronically stored personnel database, which may include logically coded nodes within a logically coded and unified hierarchy. The hierarchy may include various levels and divisions. In some embodiments, these may include tactical, operational, strategic, and inter-strategic levels and divisions. Inter-strategic, or global, may be the level at which a business enterprise forms strategic associations with other business enterprises. Responsibilities at this level may be commensurate with representation of at least one conglomerate of organizations. One level below the inter-strategic level may be the strategic level, which may include developing doctrine and policy to further the interests of the business enterprise. Responsibilities at this level may be commensurate with representation of at least one organization of multiple groups. Strategy, as used in this description, may also refer to high level guidance of a business enterprise, which may be intended to meet a desired end state. Below the strategic level may be an operational level, which may be the level at which a business enterprise plans and develops tactical level tasks to meet strategic objectives. The responsibilities at this level may be commensurate with representation of at least one group of individuals. Finally, at the tactical level, which may be below the operational level, tasks may be executed to meet operational intent and strategic objectives. The responsibilities at this level may be commensurate with the representation of at least one individual, including oneself. A node may refer to a logical representation of information in cyberspace. Nodes may be coded and manipulated using a computer programing language, which may be any of a variety of languages. In some exemplary embodiments, the computer programming language may be an object-oriented computer programming language. The levels and divisions may be cyberspace representations of personnel functional levels and divisions of responsibility in a business enterprise. Cyberspace may refer to a domain of the electromagnetic spectrum, in which electromagnetic information exists or exchanges. A node may further include relevant data to the node and all associated nodes within the unified hierarchy. Individuals within an organization or business enterprise's personnel hierarchy may be represented as a node and may be assigned a designation based upon computer programming code. The nodal designations may include the tactical, operational, strategic, and inter-strategic levels and divisions referenced above. The individual may be manifested in cyberspace as a nodal data construct with commensurate encapsulated cyberspace data constructs based upon defined qualifiers of the individual in the physical world and transformed into superordinate, equivalent, or subordinate quantifiable objects within the node in cyberspace.

In an exemplary embodiment, the system may allocate personnel based on their attributes. The allocation of personnel may be regardless of title or position within a business enterprise. Personnel may be matched to the correct objective within a business enterprise so as to best meet an overarching strategy and desired end state of that business enterprise. Personnel may be matched to objectives by mapping personnel to computer programmed nodes within the system. Nodes may be mapped to tactical, operational, strategic, or inter-strategic levels of functional responsibility within the logical cyberspace hierarchy, commensurate to human beings being mapped in a non-cyberspace business enterprise personnel hierarchy. At least one node function may be matched to at least one tactical, operational, strategic, or inter-strategic objective. An objective may be a computer programmed rule or rule set defined within the system and may represent the intended result or consequence of an activity, such as an instruction or performance. A node may be assigned a task to execute in order to meet an objective. A task may include a computer programming function executed within a computing system to meet a programmed objective. A task within the present system may be commensurate with a task performed by personnel in a non-cyberspace business enterprise. The outcome of a task assigned to a node may be compared to the objective in order to determine if an overarching strategy and desired end state of the business enterprise has been met. An outcome may include an achieved result or consequence of an executed task within the cyberspace environment and may be measured against an objective. The strategy and desired end state of a business enterprise may be represented as computer programmed rules or rule sets in the present system. The nodal hierarchy may be modified based on the outcome of the nodal execution of at least one task.

An exemplary embodiment of a position-centric personnel system may allow for assessing weak and strong nodes along a continuum within a unified nodal hierarchy in order to effectively create, reassign, modify, remove, or otherwise manipulate their placement in the unified hierarchy. The treatment of nodes may be commensurate with the treatment of strong and weak personnel within a business enterprise. Personnel may be identified, recruited, promoted, demoted, reassigned, relieved of their position, or otherwise managed. However, utilizing the system may maximize efficiency of a business enterprise with minimal trial and error time by analyzing numerous, intricate personnel manipulations quickly and accurately to find an optimal hierarchy. Relative strengths and weaknesses of nodes within a unified hierarchy of the computer-implemented position-centric personnel system may be determined through data mining all nodes relevant to a particular rule or rule set and aggregating all of the relevant data. At least one aspect of a node may be compared to the aggregated data in the context of achieving at least one tactical, operational, strategic, and/or inter-strategic objective. A similar comparison may be conducted for all relevant nodes. The results of the comparison for a given node may be viewed in the context of all the other comparisons of all other relevant nodes. The performance of each node may be compared with the previous, current, or projected instantiation of the aggregated performance of any or all remaining relevant nodes, and/or to the node itself. This may determine a node's relative weakness or strength within a business enterprise. Based on the determination, a node may be left unmodified, reassigned, or otherwise manipulated within the hierarchy, including removal, to better meet the objectives of the business enterprise, which may be manifested as computer programmed rules or rule sets. Nodes may be manipulated within the hierarchy to reflect changes in a business enterprise's non-cyberspace personnel hierarchy, and vice versa.

The computer-implemented position-centric personnel model of the present invention may also employ upon the nodal hierarchy, by way of non-limiting examples, methods of recursion, polymorphism, encapsulation, and inheritance, as well as any and all methods of string theory, quantum mechanics, stochastics, dynamic modeling, and time-series analysis to include Fourier/wavelet transforms, as would be understood by a person having ordinary skill in the art. The outcome of methods employed upon the nodal hierarchy may be used to dynamically modify the nodal hierarchy in order to manifest and realize changes of the nodal hierarchy in practical application within the physical and/or non-cyberspace business enterprise. The manifestation and realization of the nodal hierarchy within the physical and/or non-cyberspace business enterprise may be accomplished by replicating changes in the nodal hierarchy into changes in the personnel hierarchy of the business enterprise, and vice versa.

In an exemplary embodiment, an efficient and effective manner to evolve organizations to a higher-level and improved structure may be provided. The practical application may be effectively and concretely employed to replicate physical organizational evolution as modeled within a cyberspace environment, or vice versa, in order to maximize organizational return on investments and reach strategic end states for the physical organizational enterprise. Specifically, an exemplary embodiment may identify individuals better able to develop strategic doctrine, which in turn may evolve operational objectives, and may lead to improved tactical level production changes that enhance such things as safety, quality of life, and shareholder value. Therefore, the physical employment and modification of personnel behavior may be performed as recommended by the nodal equivalent in cyberspace, or vice versa. In effect, a dynamic capability to identify and optimize business practices that maximize organizational return on investment and reach strategic end states for the physical organizational enterprise may be provided. An exemplary embodiment may replicate a physical environment in addition to mirroring physical personnel. All organizational variables may optionally be included in an exemplary embodiment, thereby allowing for replication of an entire physical business enterprise. For exemplary purposes, an implementation in a military environment may follow. An exemplary embodiment may be used to win wars at a strategic level, improve employment of forces at an operational level, and discover the errors of fielding a particular tank due to the prevalence of human or technical errors at a tactical level. This may directly save lives and money. Another example may relate to biotechnology. At the inter-strategic level, alliances could be formed based upon results from a clinical trial, and vice versa. Furthermore, pharmaceuticals could be improved by identifying best practices on development within the cyberspace nodal hierarchy before fiscal and life-threatening mistakes are made in the physical business enterprise. Exemplary embodiments may be applied to all fields, from government to industry. An entire business enterprise/environment may be replicated in cyberspace, not just personnel. How a business operates from business creation to product development to point of sale and beyond may be accounted for.

In some embodiments, the position-centric personnel system may be implemented in software, including firmware, resident software, microcode, and other software embodiments as would be understood by a person having ordinary skill in the art.

Furthermore, exemplary embodiments may take the form of a computer program product accessible from a computer-usable or computer-readable medium providing program code for use by or in connection with a computer or any instruction execution system. For the purposes of this description, a computer-usable or computer readable medium may be any apparatus that can comprise, store, communicate, propagate, or transport a program for use by or in connection with the instruction execution system, apparatus, or device.

The medium may be an electronic, magnetic, optical, electromagnetic, infrared, or semiconductor apparatus or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/Output (I/O) devices (including but not limited to keyboards, displays, pointing devices, etc.) may be coupled to the system either directly or through intervening I/O controllers. Network adapters may also be coupled to the system to enable the computing system to become coupled to other computing systems or remote printers or storage devices through intervening private or public networks.

Figure 1:
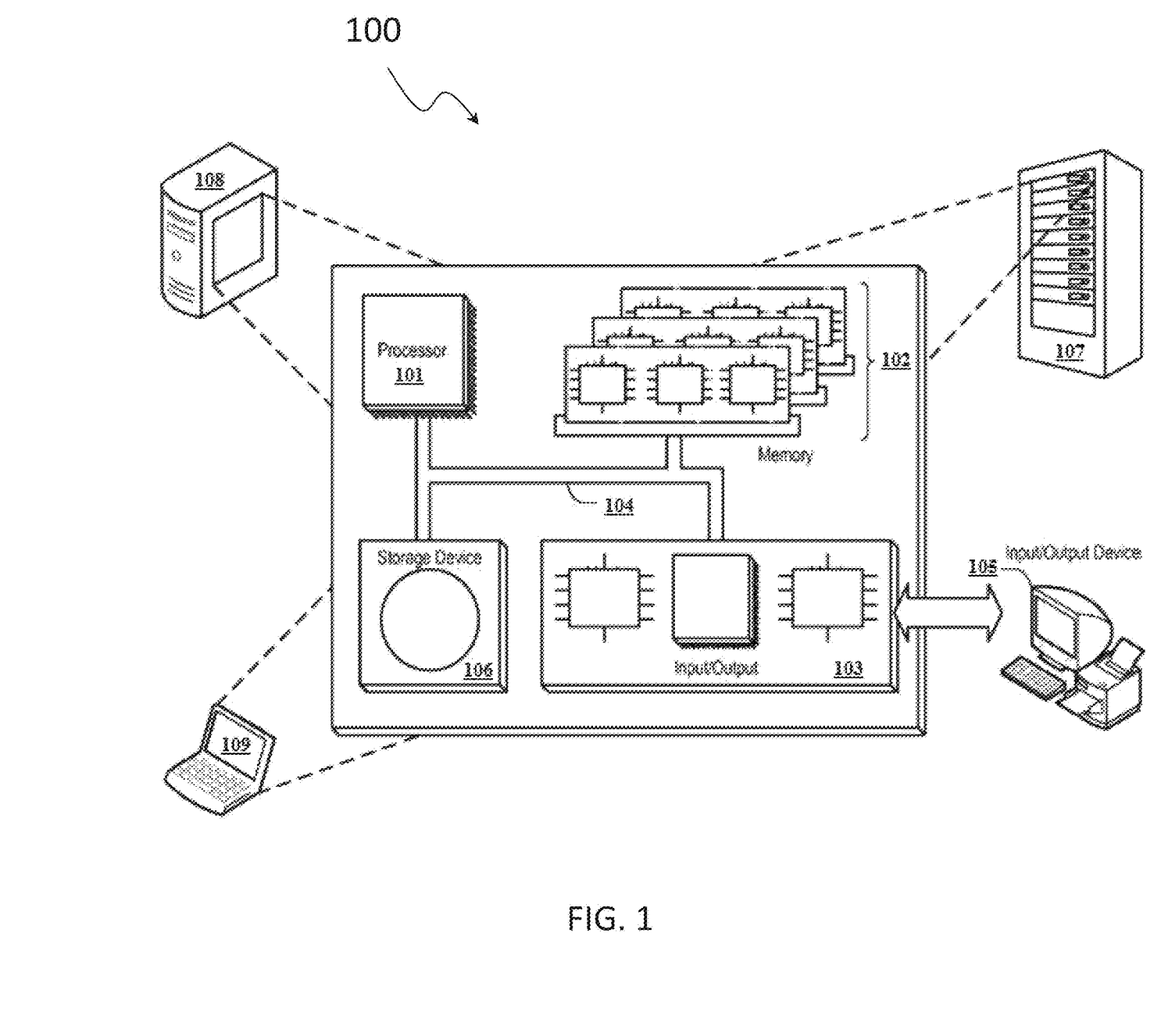
FIG. 1 shows a diagram of a computing apparatus.
Figure 2:
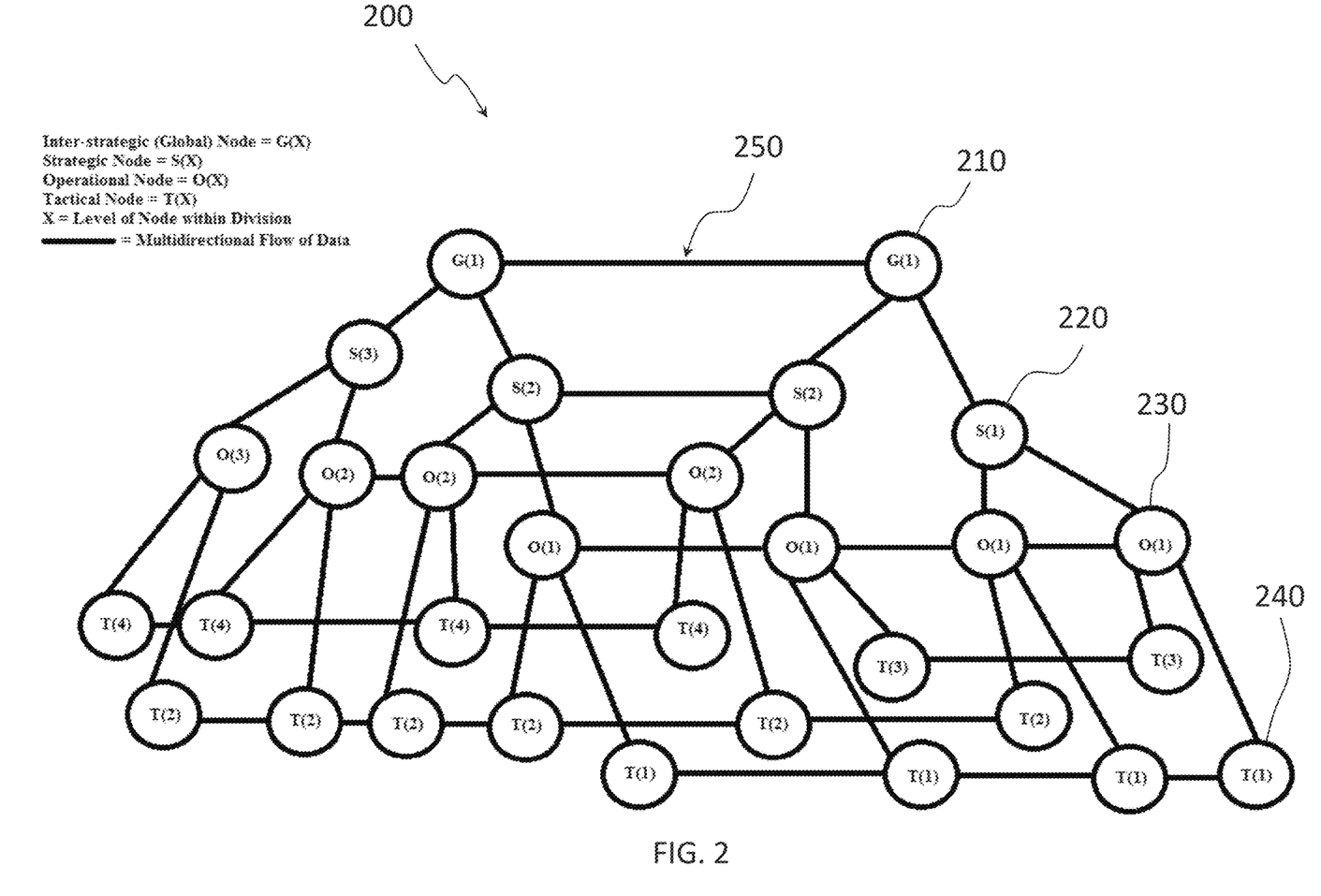
FIG. 2 shows a diagram of an exemplary nodal hierarchy.
Figure 3:
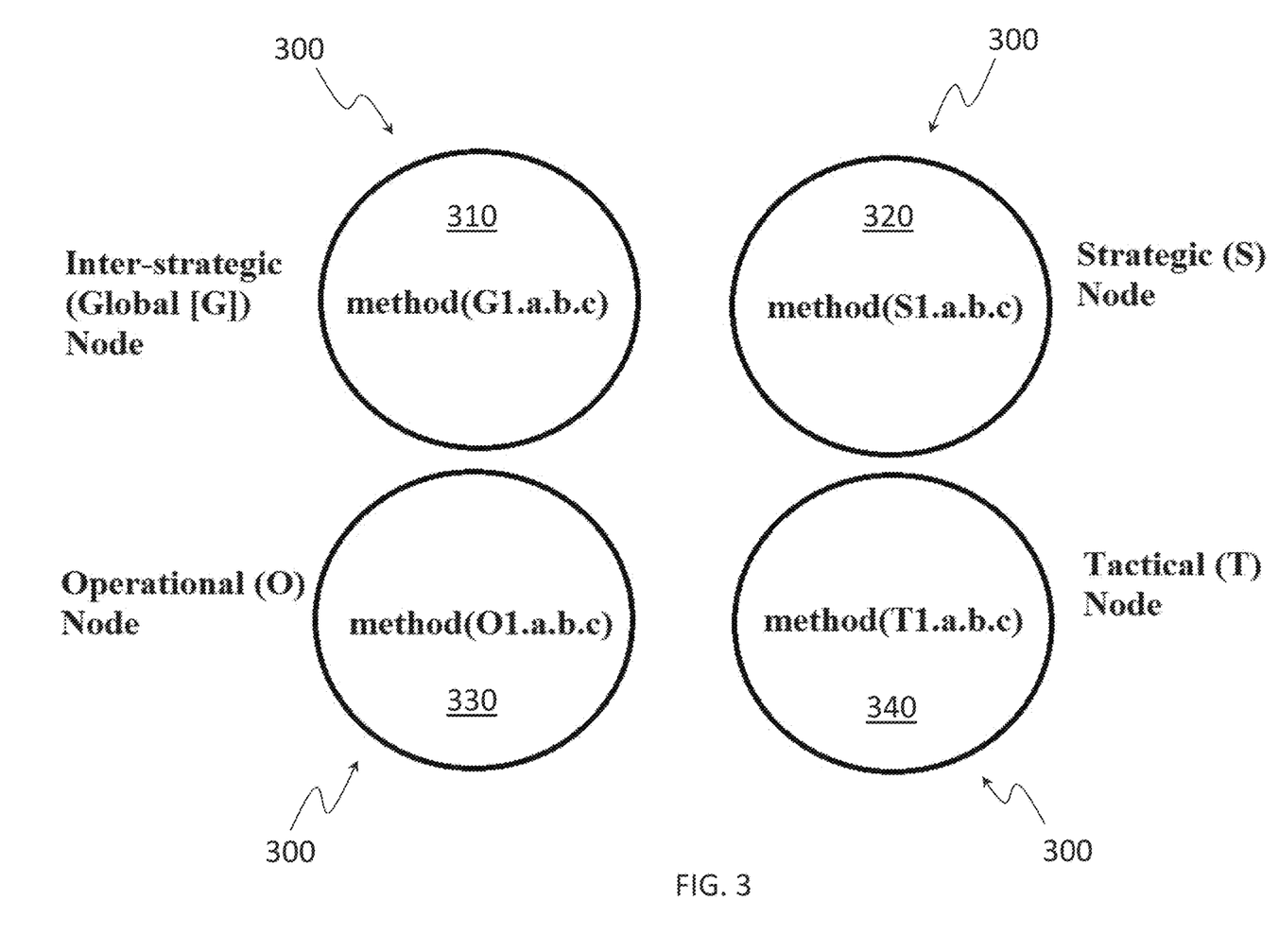
FIG. 3 shows exemplary nodal compositions of nodes within different exemplary levels of a nodal hierarchy; and Exemplary
Figure 4:
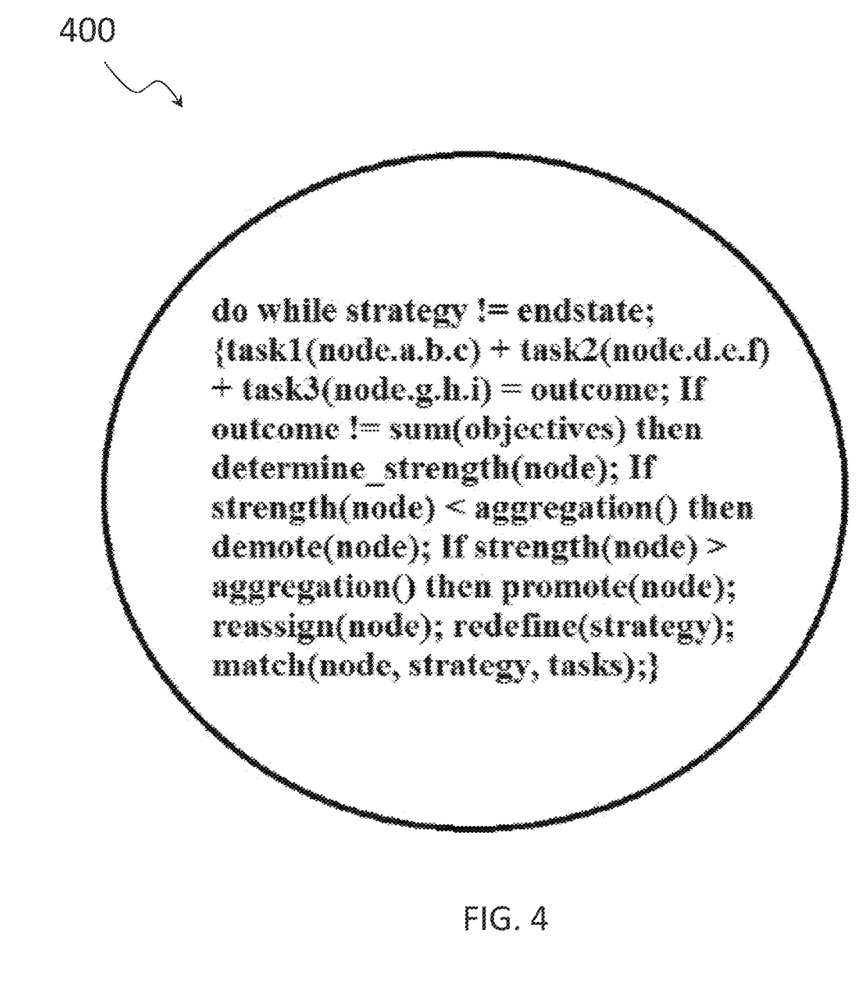
FIG. 4 shows a diagram of an exemplary sequence of events within the nodal hierarchy of FIG. 2.

FIG. 1 may show a block diagram of a computer-implemented position-centric personnel apparatus that implements the processes associated with FIGS. 2, 3, and 4. Computing apparatus 100 may generally include a central processing unit (CPU) 101, a memory 102, an input/output (I/O) interface 103, a bus 104, I/O devices 105, a storage device 106, a server 107, a local client 108, and a remote client 109. CPU 101 may perform computation and control functions of computing apparatus 100. CPU 101 may include a single processing unit, or be distributed across one or more processing units in one or more locations (e.g. on a client 108 109 and server 107).

Memory 102 may include any known type of data storage and/or transmission media, including bulk storage, magnetic media, optical media, random access memory (RAM), read-only memory (ROM), a data cache, a data object, etc. Cache memory elements of memory 102 may provide temporary storage of at least some program code in order to reduce the number of times code must be retrieved from bulk storage during execution. Storage device 106 may, for example, be a magnetic disk drive or an optical disk drive that may store data. Moreover, similar to CPU 101, memory 102 may reside at a single physical location, including one or more types of data storage, or may be distributed across a plurality of physical systems in various forms. Further, memory 102 can include data distributed across, for example, a LAN, WAN, storage area network (SAN), or the World Wide Web (not shown).

I/O interface 103 may include any system for exchanging information to or from an external source. I/O devices 105 may include any known type of external device, including a display monitor, keyboard, mouse, printer, speakers, handheld device, printer, facsimile, etc. Bus 104 may provide a communication link between each of the components in computing apparatus 100, and may comprise any type of transmission link, including electrical, optical, wireless, etc.

I/O interface 103 may also allow computing apparatus 100 to store and retrieve information (e.g., program instructions or data) from an auxiliary storage device (e.g., storage device 106). The auxiliary storage device may be a non-volatile storage device (e.g., a CD-ROM drive which may receive a CD-ROM disk). Computing system 100 may be capable of storing and retrieving information from other auxiliary storage devices (not shown), which may include a direct access storage device (DASD) (e.g., hard disk or floppy diskette), a magneto-optical disk drive, a tape drive, or a wireless communication device.

Memory 102 and/or storage device 106 and/or auxiliary storage devices (not shown) may include the master personnel database (nodal hierarchy) as well as computer program code implementing, in part, the processes associated with FIGS. 2, 3, and 4 that when executed, may manifest the logical representation in cyberspace of all components of the nodal hierarchy, as well as processes the methods employed upon the nodal hierarchy as implemented by the position-centric personnel system and disclosed herein. Further, memory 102 and/or storage device 106 and/or auxiliary storage devices (not shown) may include the master personnel database (nodal hierarchy) as well as computer program code for the position-centric personnel system methods disclosed herein. Still farther, memory 102 and/or storage device 106 and/or auxiliary storage devices (not shown) may include other apparatuses or systems not shown in FIG. 1, such as an operating system (e.g., Linux) that runs on CPU 101 and provides control of various components within and/or connected to computing apparatus 100.

Users may access the computing apparatus 100 directly using the I/O devices 105, or remotely over the LAN or intranet, the WAN or extranet, SAN, or the World Wide Web. Results may be displayed using I/O devices 105. Alternately, results may be displayed by remote I/O device(s), such as through a laptop 109.

It may be apparent that the computing apparatus 100 may include conventional components and thus various modifications or substitutions may be made. The computing apparatus 100 may embody the present invention by configuring the CPU 101 to operate in accordance with stored software programs so as to interact with the entire nodal hierarchy as well as data stored in computer program code, as explained herein. Furthermore, the entire nodal hierarchy as well as the computer program code may be self-modifying, in that the entire nodal hierarchy, in part and collectively, as well as the computer program code may execute upon itself in order to morph and/or evolve the nodal hierarchy and computer program code.

Referring to exemplary FIG. 2, a nodal hierarchy 200 may be provided. In some exemplary embodiments, the nodal hierarchy 200 may include at least one inter-strategic (global) node 210, at least one strategic node 220, at least one operational node 230, and at least one tactical node 240. A nodal hierarchy may be infinitely variable, as would be understood by a person having ordinary skill in the art. A particular nodal hierarchy may be mapped to the specific personnel structure of a desired business enterprise. As shown in exemplary FIG. 2, a nodal hierarchy may further represent the multidirectional flow of data between and within the functional and divisional levels of responsibility of a business enterprise's personnel hierarchy. In one exemplary embodiment, there may be two inter-strategic nodes 210, four strategic nodes 220, eight operational nodes 230, and sixteen tactical nodes 240. The multidirectional flow of data 250 within the hierarchy may also be represented.

Now referring to exemplary FIG. 3, the design structure of individual nodes 300 within a nodal hierarchy may be provided. An individual node may fall in a particular level or division, such as an inter-strategic (global) node 310, a strategic node 320, an operational node 330, or a tactical node 340. Each node within a level or division, such as inter-strategic, strategic, operational, or tactical, may further be assigned a sublevel within that level or division. There may be any number of sublevels within a level or division, so long as there is at least one sublevel in each level or division. Each node may further include a set of associated variables, which may encapsulate data relevant to that node in cyberspace and may represent different data for different nodes in different sequences. As shown in exemplary FIG. 3, variables may include a, b, and c. Non-limiting examples of data represented by variables may include an individual's or organization's physical characteristics, personality traits, cultural factors, socioeconomic information, political affiliations, inter-nodal associations, as well as links to environmental variables that may influence the nodes and the cyberspace environment in which the nodes may interact. In some embodiments, the encapsulated data may become superordinate to the node itself in the arrangement of the function sequence, thereby influencing environmental variables. There may be an infinite number of variables that may encapsulate separate data relevant to a particular node. Each node may have a function employed upon it. As shown in exemplary FIG. 3, the function "method" may refer to a method employed upon a particular node. An infinitely variable number of nodal compositions, to include methods employed upon them, may be possible.

An exemplary node coded with tasks may be provided in FIG. 4. Each node, which may be a cyberspace representation of a single person in a business enterprise, may be coded with tasks to meet objectives. The outcome of executing the tasks within the cyberspace environment may be compared to the objectives. The comparison may reveal whether the objectives have been satisfactorily accomplished to meet a desired business enterprise strategy, and in turn, a desired end state of the business enterprise in terms of predefined rules or rule sets. A resulting level of objective accomplishment to meet the business enterprise strategy by each node may then be compared to the aggregation of all other nodes' resulting level of objective accomplishments to meet the business strategy. The comparison of an individual node's results with the aggregation of all other nodes' results may be used to determine the relative strength of the node within the overall nodal hierarchy. Based on the results, the nodal hierarchy may be modified to more efficiently accomplish objectives and meet the overall business strategy. The nodal hierarchy may be modified based on individual nodes' newly determined relative strength within the overall nodal hierarchy. The hierarchy may be modified to more effectively meet the business enterprise strategy and may continue to be modified until a desired end state of the business enterprise is reached. Whether or not an individual node satisfactorily accomplishes its objectives, additional functions pertaining to its comparison with the remainder of the nodes, the potential reorganization of the hierarchy, and potential redefining of the strategy may still execute. Despite a single node's successful accomplishment of objectives, other nodes' performances may affect the hierarchy, including the status of successful nodes. Strategy redefinition may continue until the strategy converges on a desired end state of the business enterprise, as represented in the exemplary programming code of FIG. 4. Objective redefinition may be inherent within strategy redefinition and consequently that particular function may not be represented in exemplary FIG. 4. The exemplary computer programming code depicted in the individual node represented in FIG. 4 may not be comprehensive, nor may it represent the computer programming code within or outside of a node. However, it may represent an exemplary, non-limiting, flow from task execution through node assignment, to strategy redefinition and to nodal realignment, until the end state of the business enterprise may be met within the nodal hierarchy. An end state may or may not be reached at the completion of this exemplary flow.

In accordance with the exemplary algorithm shown in FIG. 4, a possible implementation may be provided as follows. The possible implementation may relate to a notional biotechnology company having a strategy to develop a cure for cancer, however, it may be understood by a person having ordinary skill in the art that implementations may not be limited to this field. The end state in the present example may be a cure for cancer. As part of the strategy and operational objectives, three tasks may be required of three different individuals or nodes. The first task by a first individual may be to isolate a cancer cell based upon three variables (a, b, c). These variables may include the technique used, the climate conditions of the lab, and the personality traits of the individual. The second task by a second individual may be to test substrates on the cancer cell based upon three variables (d, e, f). These variables may include the type of substrate, the level of the individual in the nodal hierarchy (e.g. operational, tactical), and the use of a new procedure for introducing the substrate to the cancer cell. The third task by a third individual may be to compile the results of the data based upon three variables (g, h, i). These variables may include whether the substrates met their primary endpoints, the time the report is due, and the level of the individual in the nodal hierarchy (e.g. operational, tactical). Based upon the execution of these three tasks by these three individuals, an outcome may be derived. If the outcome of these three tasks does not result in a substrate that eliminated the cancer cell as indicated by the sum of objectives, then the strength of the performance of each individual in the chain of execution may be calculated. In this example, the strength of the performance of the individual reporting the results may have been less than the aggregate performance of the group. This individual may therefore be demoted and no longer in charge of reporting results. Since the other two individuals may have been near the aggregate baseline of performance, they may be neither promoted nor demoted. In effect, only the individual reporting the results may be reassigned. The company's strategy may then be redefined based upon the outcome of the substrates' impact on the cancer cell. All individuals may then be matched to the new strategy and assigned new tasks until the end state is achieved, which as previously identified is curing cancer. For iterations before the end state is achieved, cross-comparisons to individuals accomplishing similar tasks within the organization may be analyzed to predict the best individual to be assigned to said tasks. This may be just one exemplary embodiment of an infinitely variable array of embodiments.

There may be an infinitely variable number of sequences of events, of varying complexities, performed within a nodal hierarchy. For exemplary purposes, one sequence of events may be provided as follows. Inter-strategic (global) nodes and functions may be aggregated to create strategic tasks and objectives that guide strategic nodes and functions using the inter-strategic rules and rule sets. Strategic nodes and functions may be aggregated to create operational tasks and objectives that guide operational nodes and functions using the strategic rules and rule sets. Operational nodes and functions may be aggregated to create tactical tasks and objectives that may guide tactical nodes and functions using the operational rules and rule sets. Tactical nodes and functions may execute tactical tasks to achieve the objectives. Tactical nodes and functions may further complete a loop by providing recursive feedback to superordinate levels. This may also perpetually influence the inter-strategic (global) nodes' and functions' aggregation of data to assist in the creation and evolution of an overarching business enterprise strategy that may be manifested in continually evolving inter-strategic rules and rule sets, so as to meet a desired end state of the business enterprise. The desired end state of the business enterprise may also manifest continually evolving rules and rule sets within the nodal hierarchy. In other words, the nodal hierarchy and all components within the nodal hierarchy may be more than merely static elements.

When implemented by organizations, components may be modified or changed, such as the name or existence of various levels and divisions. Personnel may be mapped in cyberspace to nodes within a computer-implemented position-centric personnel system dependent upon his or her functional level and/or division of responsibility within a business enterprise. Additionally, the computer-implemented position-centric personnel system may not be the only influence of a business enterprise's personnel hierarchy and therefore changes within the nodal hierarchy may be discarded or overruled to reflect the non-cyberspace decisions of a subject business enterprise. Likewise, selective business enterprise decisions may optionally be made to reflect changes within the cyberspace nodal hierarchy, including changes within the nodal hierarchy to previous business enterprise decisions. The nodal hierarchy may be manipulated manually or automated depending on the level of autonomy and/or complexity the business enterprise chooses to implement, as would be understood by a person having ordinary skill in the art. Certain additional considerations may be accounted for through the personnel assessment or by decision makers manipulating personnel based on an assessment. These considerations may include financial guidelines and availability of personnel.

Exemplary data encapsulated and residing outside of each node may include some or all descriptors relevant to both personnel and the environment in which they function. Just as environmental variables in the physical world may impact individuals in terms of personality changes, physical characteristic changes, health, etc., so to may personnel changes in the physical world impact the external environment. In effect, when a node is reassigned within the business personnel hierarchy, it may be accomplished based upon the immediate needs of the organization, and within the constraints of the environment and the individual's (node's) own limitations. Therefore, regardless of reassignments and constraints, nodes may not be limited to accomplishing a single objective, such as the example objective shown in FIG. 4, but rather may be simultaneously tasked with completing and addressing multiple objectives.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A non-transitory computer-readable medium for replicating and assessing personnel hierarchy, comprising instructions stored thereon, that when executed on a processor, perform the steps of:

mapping personnel attribute data to logically coded nodes within a logically coded unified hierarchy wherein each node comprises at least one associated variable encapsulating data relevant to that node;

mapping environmental data, the environmental data including physical, logical, virtual, or cognitive environment data, to the logically coded unified hierarchy;

performing a first function corresponding to a first environmental data or data set corresponding to a first rule or rule set for a first node in the logically coded nodes, wherein said first function is a first multivariate function incorporating as input at least one first performance outcome and at least one of the personnel attribute data and the environmental data, and generating a first function result, the first function result comprising a first environmental outcome contribution;

storing the first function result for or within the first environmental data or data set;

evolving the first environmental data or data set based on the first function result, wherein evolving the first environmental data or data set comprises modifying the first rule or rule set into a second rule or rule set to optimize the logically coded unified hierarchy;

performing a second function corresponding to a second environmental data or data set corresponding to the second rule or rule set for the first node in the logically coded nodes, wherein said second function is a second multivariate function incorporating as input at least one second performance outcome and at least one of the personnel attribute data and the environmental data, and generating a second function result, the second function result comprising a second environmental outcome contribution;

storing the second function result for or within the second environmental data or data set;

comparing performance of the first rule or rule set for the first environmental data or data set for the first node against performance of the second rule or rule set for the second environmental data or data set for the first node;

evaluating, based on comparing the performance of the first node based on the first rule or rule set against the performance of the first node based on the second rule or rule set, whether an adjustment of the first or second environmental data or data set is needed; and when an adjustment of the first or second environmental data or data set is needed, evolving a plurality of environmental data or datasets by automatically creating, modifying or eliminating at least one rule, rule set, or node within the hierarchy by adjusting the at least one rule, rule set, or node governing the plurality of environmental data or datasets.

2. The non-transitory computer-readable medium of claim 1, further comprising repeating until a desired state is achieved.

3. The non-transitory computer-readable medium of claim 2, further comprising repeating indefinitely to continuously optimize the environmental data.

4. The non-transitory computer-readable medium of claim 1, wherein the environmental data is static or dynamic.

5. The non-transitory computer-readable medium of claim 1, wherein the environmental data comprises land, maritime, air, space, cyberspace, and multidimensional space.

6. The non-transitory computer-readable medium of claim 1, wherein the environmental data comprises physics guidelines requiring that the creating, modifying, or eliminating the at least one rule, rule set, or node complies with laws of nature.

7. The non-transitory computer-readable medium of claim 1, wherein the environmental data comprises restraints or constraints requiring that the creating, modifying, or eliminating the at least one rule, rule set, or node complies with moral, ethical, legal, technical, international, or organizational guidelines.

8. The non-transitory computer-readable medium of claim 1, wherein the environmental data comprises private or publicly available information.

9. The non-transitory computer-readable medium of claim 1, further comprising replicating changes to a physical, logical, virtual, or cognitive environment of an organization in the nodal hierarchy environment.

10. A computer-implemented position-centric personnel apparatus comprising:

a memory device configured to store a data structure comprising information related to an individual's performance within an organizational hierarchy wherein the data structure further comprises data pertaining to at least one physical, logical, virtual, or cognitive environmental variable, a personnel database comprising logically coded nodes within a logically coded unified hierarchy, wherein each logically coded node corresponds to an individual and the logically coded unified hierarchy corresponds to an organizational hierarchy, and a plurality of rules or rule sets associated with an organizational objective or strategy;

an input/output device to allow a user to input data, observe results, and set rules; and a processor configured to perform functions derived from the plurality of rules or rulesets, wherein the functions comprise:

a first function corresponding to a first environmental data or data set corresponding to a first rule or rule set for a first node in the logically coded nodes, wherein said first function is a first multivariate function incorporating as input at least one first performance outcome and at least one of the personnel attribute data and the environmental data, and generating a first function result, the first function result comprising a first environmental outcome contribution, storing the first function result for or within the first environmental data or data set, and evolving the environmental data or data set based on the first function result, wherein evolving the environmental data or data set comprises modifying the first rule or rule set into a second rule or rule set to optimize the logically coded unified hierarchy;

performing a second function corresponding to a second environmental data or data set corresponding to the second rule or rule set for the first node in the logically coded nodes, wherein said second function is a second multivariate function incorporating as input at least one second performance outcome and at least one of the personnel attribute data and the environmental data, and generating a second function result, the second function result comprising a second environmental outcome contribution; storing the second function result for or within the second environmental data or data set;

the processor further configured to: compare performance of the first rule or rule set for the first environmental data or data set for the first node against performance of the second rule or rule set for the second environmental data or data set for the first node;

to evaluate, based on comparing the performance of the first node based on the first rule or rule set against the performance of the first node based on the second rule or rule set, whether an adjustment of the first or second environmental data or data set is needed; and when an adjustment of the first or second environmental data or data set is needed, evolve a plurality of environmental data or datasets by automatically creating, modifying or eliminating at least one rule, rule set, or node within the hierarchy by adjusting the at least one rule, rule set, or node governing the plurality of environmental data or datasets.

11. The apparatus of claim 10, wherein the data pertaining to at least one physical, logical, virtual, or cognitive environmental variable is further classified based on physical, logical, virtual, or cognitive descriptive information for or within the logically codified unified hierarchy, corresponding to the physical, logical, virtual, or cognitive manifestation of the descriptive information for or within an organization.

12. A method for replicating and assessing personnel hierarchy, comprising: mapping personnel attribute data to logically coded nodes within a logically coded unified hierarchy wherein each node comprises at least one associated variable encapsulating data relevant to that node;

mapping environmental data, the environmental data including physical, logical, virtual, or cognitive environment data, to the logically coded unified hierarchy;

performing a first function corresponding to a first environmental data or data set corresponding to a first rule or rule set for a first node in the logically coded nodes, wherein said first function is a first multivariate function incorporating as input at least one first performance outcome and at least one of the personnel attribute data and the environmental data, and generating a first function result, the first function result comprising a first environmental outcome contribution;

storing the first function result for or within the first environmental data or data set;

evolving the first environmental data or data set based on the first function result, wherein evolving the first environmental data or data set comprises modifying the first rule or rule set into a second rule or rule set to optimize the logically coded unified hierarchy;

performing a second function corresponding to a second environmental data or data set corresponding to the second rule or rule set for the first node in the logically coded nodes, wherein said second function is a second multivariate function incorporating as input at least one second performance outcome and at least one of the personnel attribute data and the environmental data, and generating a second function result, the second function result comprising a second environmental outcome contribution;

storing the second function result for or within the second environmental data or data set;

comparing performance of the first rule or rule set for the first environmental data or data set for the first node against performance of the second rule or rule set for the second environmental data or data set for the first node;

evaluating, based on comparing the performance of the first node based on the first rule or rule set against the performance of the first node based on the second rule or rule set, whether an adjustment of the first or second environmental data or data set is needed; and when an adjustment of the first or second environmental data or data set is needed, evolving a plurality of environmental data or datasets by automatically creating, modifying or eliminating at least one rule, rule set, or node within the hierarchy by adjusting the at least one rule, rule set, or node governing the plurality of environmental data or datasets.

13. The method of claim 12, further comprising repeating until a desired state is achieved.

14. The method of claim 13, further comprising repeating indefinitely to continuously optimize the environmental data.

15. The method of claim 12, wherein the environmental data is static or dynamic.

16. The method of claim 12, wherein the environmental data comprises land, maritime, air, space, cyberspace, and multidimensional space.

17. The method of claim 12, wherein the environmental data comprises physics guidelines requiring that the creating, modifying, or eliminating the at least one rule, rule set, or node complies with laws of nature.

18. The method of claim 12, wherein the environmental data comprises restraints or constraints requiring that the creating, modifying, or eliminating the at least one rule, rule set, or node complies with moral, ethical, legal, technical, international, or organizational guidelines.

19. The method of claim 12, wherein the environmental data comprises private or publicly available information.

20. The method of claim 12, further comprising one or more of replicating changes to a physical, logical, virtual, or cognitive environment of an organization in the nodal hierarchy environment, and replicating changes to the nodal hierarchy environment in the physical, logical, virtual, or cognitive environment of the organization.

* * * * *